(12) United States Patent
Breuer et al.

(10) Patent No.: US 8,213,384 B2
(45) Date of Patent: Jul. 3, 2012

(54) HANDOVER IN A RADIO COMMUNICATION SYSTEM

(75) Inventors: Volker Breuer, Bötzow (DE); Frank Lamprecht, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 408 days.

(21) Appl. No.: 12/227,177

(22) PCT Filed: Apr. 26, 2007

(86) PCT No.: PCT/EP2007/054103
§ 371 (c)(1),
(2), (4) Date: Oct. 8, 2009

(87) PCT Pub. No.: WO2007/128704
PCT Pub. Date: Nov. 15, 2007

(65) Prior Publication Data
US 2010/0027505 A1   Feb. 4, 2010

(30) Foreign Application Priority Data
May 10, 2006  (EP) ..................................... 06009669

(51) Int. Cl.
*H04W 4/00* (2009.01)
*H04W 36/00* (2009.01)

(52) U.S. Cl. .......................... 370/331; 455/438; 455/443
(58) Field of Classification Search .................. 370/331; 455/438–443
See application file for complete search history.

(56) References Cited

U.S. PATENT DOCUMENTS

| | | | |
|---|---|---|---|
| 2005/0124345 A1 | 6/2005 | Laroia et al. | |
| 2005/0143074 A1* | 6/2005 | Bassompierre et al. | ...... 455/444 |

FOREIGN PATENT DOCUMENTS

| | | |
|---|---|---|
| EP | 1 608 121 | 12/2005 |
| JP | 2002-300628 | * 11/2002 |
| WO | 02/089502 | 11/2002 |

* cited by examiner

*Primary Examiner* — Ronald Abelson
(74) *Attorney, Agent, or Firm* — Staas & Halsey LLP

(57) ABSTRACT

In a method for communication by radio a first network radio station allocates radio resources to a subscriber station and communicates with the subscriber station using a portion of the radio resources. A second network radio station uses another portion of the radio resources to send a signaling signal which is intended exclusively for the subscriber station. The first network radio station and/or the second network radio station receives a message from the subscriber station, acknowledging receipt of the signaling signal. In response to the message from the subscriber station, the communication of the subscriber station is handed over from the first network radio station to the second network radio station.

29 Claims, 2 Drawing Sheets

HANDOVER IN A RADIO COMMUNICATION SYSTEM

CROSS REFERENCE TO RELATED APPLICATIONS

This application is based on and hereby claims priority to International PCT Application No. PCT/EP2007/054103 filed on Apr. 26, 2007 and European Application No. EP06009669 filed on May 10, 2006, the contents of which are hereby incorporated by reference.

BACKGROUND OF THE INVENTION

The invention relates to a method for communication by radio, in which a subscriber station is handed over from a first to a second network-based radio station.

In radio communication systems, messages, for example containing voice information, image information, video information, SMS (Short Message Service), MMS (Multimedia Messaging Service) or other data, are transmitted between a sending and a receiving station via a radio interface using electromagnetic waves. In this case, depending on the specific configuration of the radio communication system, the stations may be various kinds of subscriber stations or network-based radio stations, such as repeaters, radio access points or base stations. In a mobile radio communication system, at least some of the subscriber stations are mobile radio stations. The electromagnetic waves are emitted at carrier frequencies which are in the frequency band provided for the respective system.

Current mobile radio communication systems are often in the form of cellular systems, e.g. based on the GSM (Global System for Mobile Communication) or UMTS (Universal Mobile Telecommunications System) standard, with a network infrastructure comprising base stations, devices for inspection and control of the base stations and other network-based devices, for example. Aside from these cellular, hierarchic radio networks organized over a wide area (superlocal), there exist wireless local area networks (WLANs) with a radio coverage area with generally much greater physical limitation. Examples of various standards for WLANs are HiperLAN, DECT, IEEE 802.11, Bluetooth and WATM.

To achieve the most efficient transmission of data possible, the entire available frequency band can be broken down into a plurality of subbands (multicarrier method). The idea on which the multicarrier systems are based is to transfer the initial problem of transmitting a broadband signal to the transmission of a plurality of narrowband signals. Splitting the available bandwidth into a plurality of narrowband subbands allows a much higher level of granularity for the data transmission when the data to be transmitted are distributed over the various subbands, i.e. the radio resources can be distributed over the data to be transmitted or over the subscriber stations with a great deal of fineness. An example of a multicarrier transmission method is OFDM (Orthogonal Frequency Division Multiplexing), in which pulse forms which are approximately rectangular over time are used for the subbands. The frequency spacing of the subbands is chosen such that, in the frequency domain, at that frequency at which the signal in one subband is evaluated, the signals in the other subbands have a zero crossing. The subbands are therefore orthogonal with respect to one another.

If a radio communication system contains a plurality of network-based radio stations, the mobility of subscriber stations means that it is advantageous if it is possible for a subscriber station to be handed over from a first to a second network-based radio station without the need for the subscriber station's communication to be aborted. In the case of what is known as a hard handover, the subscriber station communicates with the first network-based radio station prior to the handover and communicates with the second network-based radio station after the handover; accordingly, the subscriber station is not connected to both network-based radio stations simultaneously.

SUMMARY

One potential object is to define methods for communication by radio in which a subscriber station is handed over from a first to a second network-based radio station. In addition, a subscriber station and a radio communication system for carrying out the methods are intended to be presented.

The inventors propose a method for communication by radio, in which a first network-based radio station allocates a subscriber station radio resources and communicates with the subscriber station using a portion of the radio resources. A second network-based radio station uses another portion of the radio resources to send a signaling signal which is intended exclusively for the subscriber station. The first network-based radio station and/or the second network-based radio station receives a message from the subscriber station confirming receipt of the signaling signal. The message from the subscriber station prompts the communication of the subscriber station to be handed over from the first to the second network-based radio station.

The inventors also propose a second method for communication by radio, in which a subscriber station receives from a first network-based radio station information concerning an allocation of radio resources to the subscriber station and communicates with the first network -based radio station using a portion of the radio resources. The subscriber station uses another portion of the radio resources to receive a signaling signal which is intended exclusively for the subscriber station from a second network-based radio station. The subscriber station sends a message confirming receipt of the signaling signal to the first network-based radio station and/or the second network-based radio station. The communication of the subscriber station handed over from the first to the second network-based radio station.

A message is sent from the first network-based radio station to the subscriber station which allocates the subscriber station radio resources. For the communication between the first network-based radio station and the subscriber station, however, these radio resources are not used fully, but rather only a portion of these radio resources are used. This means that radio resources allocated to the subscriber station exist which are free or unused from the point of view of the first network-based radio station. These free radio resources are used fully or in part by the second network-based radio station for the purpose of emitting a signaling signal. The signaling signal is intended exclusively for the subscriber station, i.e. the subscriber station is the only addressee of the signaling signal, while other subscriber stations do not require or use it.

The subscriber station informs one or both of the network-based radio stations that it has received the signaling signal from the second network-based radio station. The handover takes place upon this confirmation from the subscriber station. This is a hard handover, i.e. the service used by the subscriber station is provided by the first network-based radio station prior to the handover and is provided by the second network-based radio station after the handover, without this provision being made by both network-based radio stations simultaneously.

In one development, the communication between the subscriber station and the first network-based radio station takes place at the same time as the signaling signal is sent by the second network-based radio station. From the point of view of the subscriber station, it is therefore receiving messages from the first network-based radio station and/or sending messages to the first network-based radio station, while simultaneously receiving the signaling signal from the second network-based radio station. This is made possible by virtue of there being no overlap between the portion of the radio resources which is used for the communication with the first network-based radio station and the other portion of the radio resources which is used by the second network-based radio station for the signaling signal.

In one particularly preferred embodiment, the radio resources are a plurality of subbands of a frequency band. The first network-based radio station uses one or more of these subbands to communicate with the subscriber station, and the second network-based radio station uses one or more of these subbands to emit the signaling signal, there being no overlap between the subbands used by the first and second network-based radio stations. It is advantageous if each subband allocated to the subscriber station by the first network-based radio station is used either by the first network-based radio station for communication with the subscriber station or by the second network-based radio station for sending the signaling signal. Preferably, the subbands are a block of adjacent subbands in the frequency domain. In addition to the subbands, the radio resources may comprise time intervals.

In one development, the signaling signal from the second network-based radio station is a synchronization signal. This synchronization signal can be used for frequency synchronization, but preferably at least also for time synchronization. It is advantageous if the subscriber station uses the synchronization signal to perform synchronization which allows the communication with the second network-based radio station. In this case, the synchronization serves to prepare the communication between the subscriber station and the second network-based radio station and is a necessary condition therefor. The fact that the synchronization can take place while the subscriber station is still communicating via the first network-based radio station allows the communication to be changed over from the first to the second network-based radio station without any delay.

In one refinement, the second network-based radio station takes the handover as a basis for stopping sending the signaling signal. The signaling signal is thus no longer emitted if the subscriber station is already communicating with the second network-based radio station.

Advantageously, the handover may immediately be followed by the communication between the subscriber station and the second network-based radio station using the other portion of the radio resources. Hence, the subscriber station first of all receives the signaling signal on the other portion of the radio resources, and then the subscriber station's communication is continued on these same radio resources. This has the advantage that immediately after the handover it is not necessary to reallocate radio resources before the communication can be continued. In addition, the effect which may be achieved by this is that the communication between the subscriber station and the second network-based radio station does not involve the use of any radio resources which are also used by the first network-based radio station, which means that interference is avoided. It is therefore also advantageous to determine the other portion of the radio resources such that the subscriber station's communication can be continued after the handover to the same or similar extent in comparison with the state prior to the handover.

In one development, the first network-based radio station sends the second network-based radio station information concerning the other portion of the radio resources prior to the signaling signal being sent by the second network-based radio station. It is advantageous if the first network-based radio station or a device connected thereto decides what radio resources the second network-based radio station may use when sending the signaling signal. The second network-based radio station can then be informed by the first network-based radio station about the decision made. The information concerning the other portion of the radio resources can be transmitted directly between the first and the second network-based radio stations, or via one or more, preferably exclusively network-based, forwarding devices. It is advantageous if although the information concerning the other portion of the radio resources is sent to the second network-based radio station, it is not sent to the subscriber station. This is because the subscriber station knows the radio resources which are assigned to it by the first network-based radio station, the other portion of which is a subset. It is advantageous if the second network -based radio station starts to send the signaling signal after it has received the information concerning the other portion of the radio resources. In this case, the information from the first network-based radio station is an authorization or instruction to emit the signaling signal for the subscriber station.

In one development, after the handover the second network-based radio station allocates the subscriber station radio resources which are different than the radio resources. In this case, these newly allocated radio resources may be completely different than the radio resources allocated by the first network-based radio station, but there may also be an overlap between the new and the previously allocated radio resources. In one refinement, prior to the allocation of the radio resources the first network-based radio station receives a message from the subscriber station concerning the handover of the communication of the subscriber station from the first to the second network-based radio station. This message from the subscriber station may be a trigger for the subsequent steps. The message from the subscriber station preferably provides identification information for the second network-based radio station; it may contain measurement values which the subscriber station has taken from signals from the second network-based radio station.

It is possible that prior to the allocation of the radio resources the first network-based radio station and the subscriber station communicate with one another using radio resources which are different than the radio resources. In this case, the radio resources can be allocated on the basis of the imminent handover. For this, it is possible to select radio resources which are particularly suitable for handover to the second network-based radio station by selecting subbands, for example, which are in proximity to the subbands used by the second network-based radio station.

In one development, the first network-based radio station receives the message from the subscriber station confirming receipt of the signal and sends the second network-based radio station an instruction to perform the handover. Conversely, it is also possible for the second network-based radio station to receive the message from the subscriber station confirming receipt of the signal and to send the first network-based radio station an instruction to perform the handover. The instruction to perform the handover asks the respective other network-based radio station to perform its substeps of the handover. In reference to an instruction to the first network-based radio station, this may involve, by way of example, forwarding data which are to be sent to the subscriber station to the second network-based radio station, and stopping the communication with the subscriber station. In reference to an instruction to the second network-based radio station, this may involve, by way of example, stopping the emission of the signaling signal, and starting the communication with the subscriber station.

The communication of the subscriber station is preferably communication in the downlink, i.e. sending messages from the respective network-based radio station to the subscriber station. Alternatively, it may be communication in the uplink or communication in the uplink and downlink.

The subscriber station for communication by radio has a receiver for receiving information from a first network-based radio station concerning an allocation of radio resources to the subscriber station and a link for communicating with the first network-based radio station using a portion of the radio resources, and a receiver for using another portion of the radio resources to receive a signaling signal from a second network-based radio station which is intended exclusively for the subscriber station, and a transmitter for sending a message confirming receipt of the signaling signal to the first and/or the second network-based radio station, and also finally a handover unit for handing over the communication of the subscriber station from the first to the second network-based radio station.

The radio communication system comprises a first and a second network-based radio station. There is an allocation unit in the first network-based radio station for allocating radio resources to a subscriber station and for communicating with the subscriber station using a portion of the radio resources, and also a transmitter in the second network-based radio station for sending a signaling signal intended exclusively for the subscriber station using another portion of the radio resources, and a receiver in the first and/or the second network-based radio station for receiving a message from the subscriber station confirming receipt of the signaling signal, and handover units in the first and second network-based radio stations for handing over the communication of the subscriber station from the first to the second network-based radio station upon the message from the subscriber station.

The subscriber station and the radio communication system are particularly suitable for carrying out the methods, and this can also apply to the refinements and developments.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
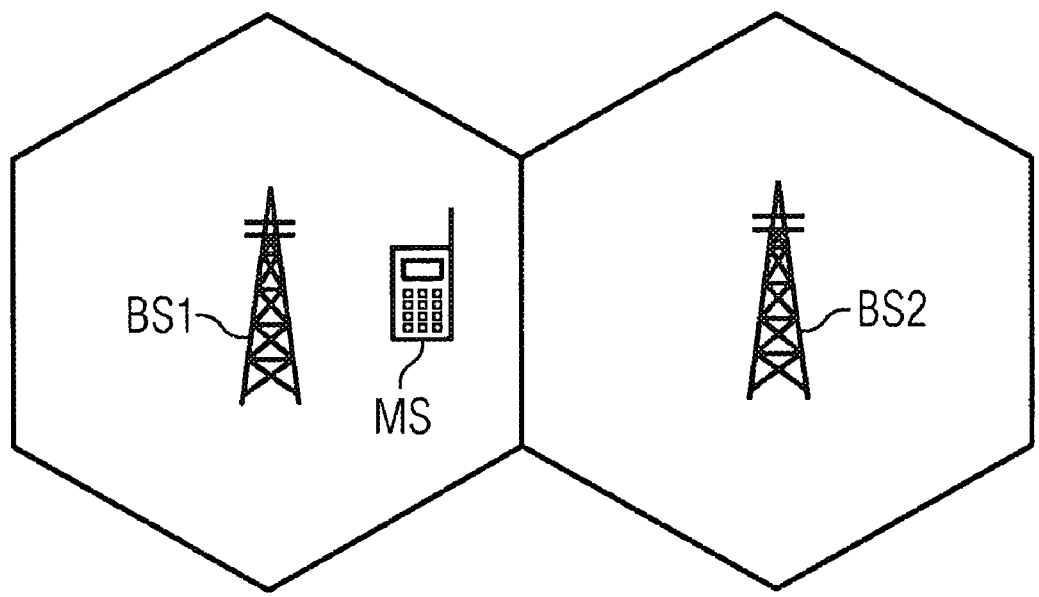
FIG. 1 shows a detail from a mobile radio communication system.

Reference will now be made in detail to the preferred embodiments of the present invention, examples of which are illustrated in the accompanying drawings, wherein like reference numerals refer to like elements throughout.

The detail from a mobile radio communication system which is shown in FIG. 1 shows the radio cells of the two adjacent network-based radio stations BS1 and BS2, illustrated as hexagons for simplicity. The radio cell of the first network-based radio station BS1 contains the subscriber station MS. For reasons of clarity, further network-based devices and further subscriber stations are not shown. The mobile radio communication system under consideration is preferably a 3G LTE (Long Term Evolution) system. The proposed methods and devices can also be applied to other radio communication systems, however.

Figure 2:
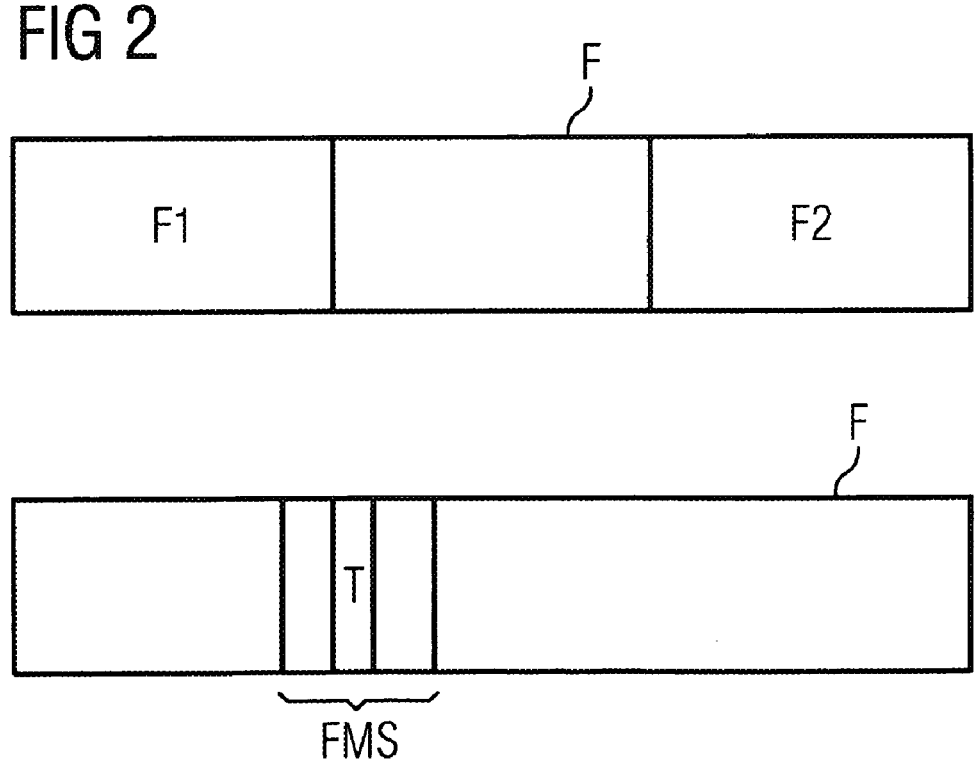
FIG. 2 shows a frequency band.

In the radio communication system under consideration, a frequency band F, shown in FIG. 2, is available which is split—not shown—into a multiplicity of subbands. Signals can be transmitted between a network-based radio station BS1 or BS2 and the subscriber station MS on one or more subbands, preferably using OFDM. To avoid interference, the first network-based radio station BS1 communicates with subscriber stations preferably in the frequency interval F1 of the frequency band F, while the second network-based radio station BS2 communicates preferably in the frequency interval F2 of frequency band F. The decision about which subbands are respectively used by the network-based radio station can be made in different ways, e.g. by central awarding or by agreement between the network-based radio stations.

It is subsequently assumed that the service currently being used by the subscriber station MS is communication in the downlink, i.e. the sending of messages from the respective network-based radio station to the subscriber station MS. The method is not limited to this instance of application, however.

The subscriber station MS is in a form such that it can receive signals only on a limited bandwidth. This bandwidth is significantly smaller than the width of the frequency band F, and the subscriber station MS can therefore use only one portion of the bandwidth available in the system at a time. By way of example, the frequency band F may have a width of 20 MHz and the bandwidth of the subscriber station MS may be 5 MHz. The subscriber station MS is notified by the network-based radio station with which it is currently communicating of what frequency the frequency range to be used by it has within the frequency band F. Such a frequency range FMS is shown in the lower part of FIG. 2. The frequency range FMS used by the subscriber station MS for communication with the first network-based radio station BS1 is preferably within the frequency interval F1. However, it may be situated entirely or in part outside the frequency interval F1 if it is determined or ascertained that the respective subbands can be used by the first network-based radio station BS1. A similar situation applies in respect of the frequency interval F2 for communication between the second network-based radio station BS2 and the subscriber station MS. If the subscriber station MS is notified that the position of the frequency range to be used by it is changing, the reception unit in the subscriber station MS is retuned, so that the new frequency interval FMS, in terms of its frequency, is now used for communication.

Figure 3:
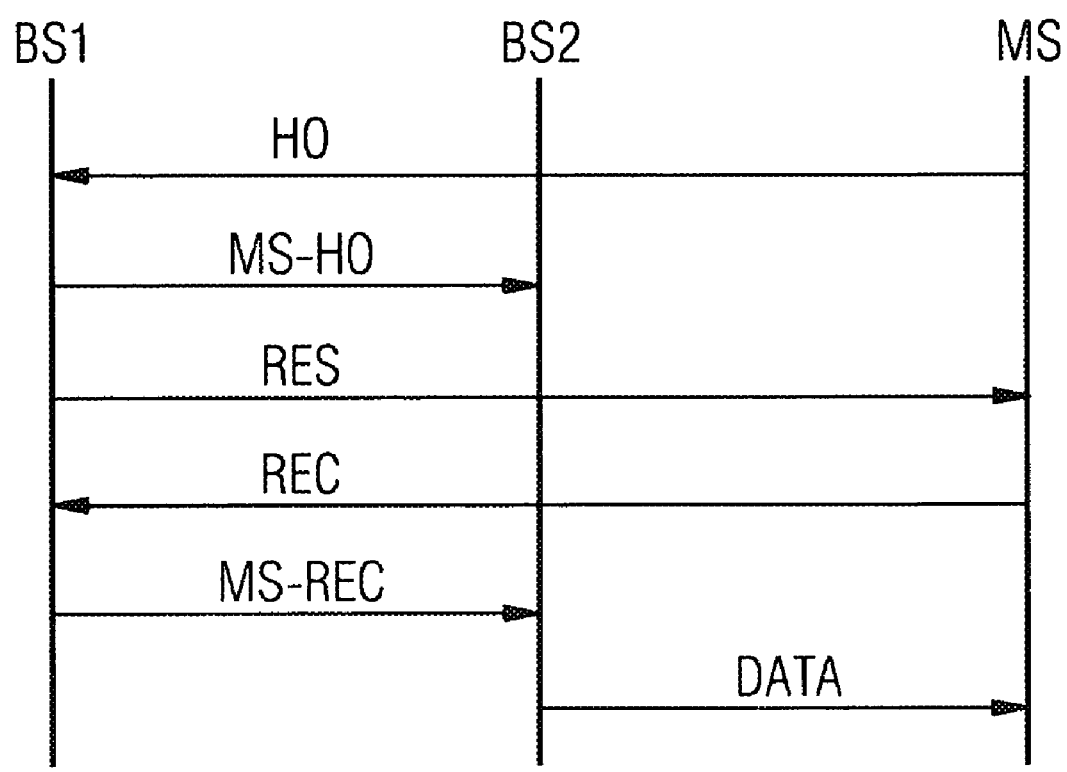
FIG. 3 shows a flowchart.

The flowchart in FIG. 3 will subsequently be used to explain handover of the subscriber station MS from the first network-based radio station BS1 to the second network-based radio station BS2. At the beginning, the subscriber station MS is assumed to be communicating with the first network-based radio station BS1. The subscriber station MS sends the first network-based radio station BS1 a message HO. The message HO indicates that a handover to the second network-based radio station BS2 is intended to be performed. This statement is based on measurements which the subscriber station MS has performed on signals from the second network-based radio station BS2. To this end, the network-based radio stations BS1 and BS2 send pilot signals which subscriber stations can use to determine how good the radio link between the respective subscriber station and the respective network-based radio station BS1 or BS2 is. The second network-based radio station BS2 emits the pilot signals preferably not only in the frequency interval F2 but rather in a form distributed over the entire frequency band F. The subscriber station MS can therefore measure the pilot signals from the second network -based radio station BS2, while it receives messages from the first network-based radio station BS1 in the frequency range FMS which has been allocated to it by the first network-based radio station BS1. As an alternative to this, it is possible for the subscriber station MS to intermittently change the frequency range it uses by retuning in order to be able to receive and measure pilot signals from the second network-based radio station BS2.

Upon the message HO, the first network-based radio station BS1 decides what position the frequency range FMS to be used by the subscriber station MS during the handover is to have. The lower part of FIG. 2 shows an advantageous position for the frequency range FMS during the handover: this is in proximity, with a slight overlap in the case shown, to the frequency interval F1. The message RES instructs the subscriber station MS to change to this frequency range FMS. An alternative position for the frequency range FMS during the handover is in proximity to the frequency interval F2. A change of position of the frequency range FMS to be used by the subscriber station MS during the handover is not fundamentally necessary, however. What is essential is that the subscriber station MS knows the frequency range in which it needs to receive and evaluate signals from the network-based radio stations BS1 and BS2 during the handover.

In addition to the statement of the frequency range FMS allocated to it, the subscriber station MS can be notified in the message RES of the time intervals for which it is allocated these subbands.

The first network-based radio station BS1 determines one or more subbands, denoted by T in the lower part of FIG. 2, which are situated in the frequency range FMS used during the handover. These may be a single subband, a plurality of adjacent subbands, or else a plurality of subbands which are distributed in the frequency range FMS. From the point of view of the first network-based radio station BS1, these are free subbands, since the first network-based radio station BS1 does not use these subbands for communication with the subscriber station MS. The message MS-HO is used by the first network-based radio station BS1 to inform the second network-based radio station BS2 that the subscriber station MS needs to be handed over from the first network-based radio station BS1 to the second network-based radio station BS2, and via the free subbands T described. On the basis of the message MS-HO, the second network-based radio station BS2 therefore knows the position of the free subbands T. In addition, the first network-based radio station BS1 can use the message MS-HO to inform the second network-based radio station BS2 about the time intervals during which the subscriber station MS is allocated the free subbands T.

After receiving the message MS-HO, the second network-based radio station BS2 starts to emit a synchronization signal on the free subbands of which it has been notified, possibly in the time intervals of which it has been notified. This is a signal which is known to the subscriber station MS as such and which the subscriber station MS uses, following receipt thereof, for time -based synchronization and/or for synchronization in the frequency domain to the second network-based radio station BS2. The synchronization signal may be a known sequence from a set of sequences which is known to the subscriber station MS. Alternatively, the synchronization signal may comprise a sequence which has been modified using a piece of identification information from the subscriber station MS. This allows the synchronization signal to be allocated directly to the subscriber station MS. This may be advantageous in the event of parallel handover processes for a plurality of subscriber stations.

The frequency of the free subbands does not need to be communicated to the subscriber station MS, since the subscriber station MS knows both the synchronization signal and the fact that on the basis of its message HO it should receive such a signal within its frequency range FMS. It is necessary to synchronize to the second network-based radio station BS2 before the communication of the subscriber station MS can be handed over to the second network-based radio station BS2.

While the synchronization signal is being emitted, communication continues between the subscriber station MS and the first network-based radio station BS1 on the remaining subbands of the frequency range FMS, i.e. on the subbands of the frequency range FMS with the exception of the free subband(s) T. There is therefore no interruption in the communication of the subscriber station MS while it is performing the synchronization to the second network-based radio station BS2. This is advantageous particularly for realtime communication. In contrast to a soft handover method, in which a subscriber station receives the same messages from the new and the old network-based radio stations on its allocated radio resources, in the present case the old network-based radio station continues to send messages on these radio resources, while the new network-based radio station only emits the synchronization signal on these radio resources.

The synchronization signal emitted by the second network-based radio station BS2 for the subscriber station MS can be distinguished from a broadcast signal which is emitted by a network-based radio station for synchronization purposes for a multiplicity of subscriber stations. The synchronization signal under consideration is emitted only during the handover, and following handover the emission thereof is stopped. In addition, it is emitted not on a channel which is common to a plurality of subscriber stations, but rather on radio resources which are allocated to the subscriber station MS.

For the subscriber station MS, receipt of the synchronization signal from the second network-based radio station BS2 means that the radio resources are from this time onward no longer allocated by the first network-based radio station BS1 but rather by the second network -based radio station BS2. After the subscriber station MS has received the synchronization signal from the second network-based radio station BS2 and has identified it as such, it performs the synchronization to the second network-based radio station BS2 as explained above. In addition, it sends the first network-based radio station BS1 a message REC. This informs the first network-based radio station BS1 that there is now no longer anything preventing performance of the handover. The first network-based radio station BS1 then uses the message MS-REC to inform the second network-based radio station BS2 that the subscriber station MS can now be handed over from the first network-based radio station BS1 to the second network-based radio station BS2. Also, any information which is available to the first network-based radio station BS1 and which needs to be sent to the subscriber station MS is forwarded to the second network-based radio station BS2. In addition, the first network-based radio station BS1 or the second network-based radio station BS2 informs the core network that in future the subscriber station MS will communicate via the second network-based radio station BS2.

As an alternative to the process described, the subscriber station MS can send the message REC to the second network-based radio station BS2, whereupon the latter informs the first network-based radio station BS1 of this using the message MS-REC.

Following receipt of the message MS-REC, the second network-based radio station BS2 stops emitting the synchronization signal. Communication now takes place between the subscriber station MS and the second network-based radio station BS2, in particular messages DATA with useful and/or signaling information are sent from the second network-based radio station BS2 to the subscriber station MS. The communication between the subscriber station MS and the first network-based radio station BS1 is continued as a result. At the beginning, only the free subbands T are used for the communication between the subscriber station MS and the second network-based radio station BS2, possibly in combination with the time intervals allocated to the subscriber station MS. This does not presuppose any fresh allocation of radio resources to the subscriber station MS, because the subscriber station MS knows that it receives signals from the second network-based radio station BS2 on these free subbands, and possibly also the time intervals in which it receives these signals. This is advantageous particularly when the second network-based radio station BS2 emits a scheduling channel in the frequency interval F2 which is used for the allocation of radio resources by the second network -based radio station BS2 to the subscriber stations communicating with it, and which cannot be received by the subscriber station MS in the frequency range FMS. It is also appropriate to match the number of free subbands—and possibly also the number of allocated time periods in reference to the free subbands—to the scope of the radio resources which is required by the subscriber station MS for the service it uses.

At a later time, the second network-based radio station BS2 uses the free subbands to notify the subscriber station MS of what frequency range FMS subsequently needs to be used for the communication between the subscriber station MS and the second network-based radio station BS2. This is preferably in the frequency interval F2. The subscriber station MS accordingly retunes its reception unit. For the further communication between the subscriber station MS and the second network-based radio station BS2, the subscriber station MS now receives a scheduling channel which is used for the allocation of radio resources by the second network-based radio stationBS2 to the substations communicating with it and which is transmitted in the frequency interval F2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method of communication by radio, the method comprising:
    allocating radio resources to a subscriber station from a first network-based radio station and communicating with the subscriber station using a portion of the allocated radio resources; and
    sending a signalling signal intended exclusively for the subscriber station from a second network-based radio station using another portion of the allocated radio resources, the another portion of the allocated radio resources being allocated by the first network-based radio station,
    wherein the first network-based radio station and/or the second network-based radio station receives a message from the subscriber station confirming receipt of the signalling signal, the message from the subscriber station prompting a communication of the subscriber station to be handed over from the first network-based radio station to the second network-based radio station, wherein the second network-based radio station stops sending the signalling signal after the subscriber station had been handed over from the first network-based radio station to the second network-based radio station.

2. The method as claimed in claim 1, wherein the communication between the subscriber station and the first network-based radio station takes place at a same time as when the signalling signal is sent by the second network-based radio station.

3. The method as claimed in claim 1, wherein
    the radio resources are a plurality of sub-bands of a frequency band.

4. The method as claimed in claim 1, wherein the signalling signal from the second network-based radio station is a synchronization signal.

5. The method as claimed in claim 4, wherein the subscriber station uses the synchronization signal to perform synchronization, thereby allowing communication between the subscriber station and the second network-based radio station.

6. The method as claimed in claim 1, wherein the handover of the subscriber station from the first network-based radio station to the second network-based radio station is immediately followed by the communication between the subscriber station and the second network-based radio station using the other portion of the radio resources.

7. The method as claimed in claim 1, wherein prior to the sending of the signalling signal, the first network-based radio station sends the second network-based radio station information concerning the other portion of the radio resources.

8. The method as claimed in claim 7, wherein the second network-based radio station starts to send the signalling signal after the second network -based radio station has received the information concerning the other portion of the radio resources.

9. The method as claimed in claim 1, wherein after the handover of the subscriber station from the first network-based radio station to the second network-based radio station, the second network-based radio station allocates to the subscriber station radio resources different than the radio resources allocated to the subscriber station from the first network-based radio station.

10. The method as claimed in claim 1, wherein prior to the allocation of the radio resources from the first network-based radio station to the subscriber station, the first network-based radio station receives a message from the subscriber station concerning the handover of the communication of the subscriber station from the first network-based radio station to the second network-based radio station.

11. The method as claimed in claim 1, wherein prior to the allocation of the radio resources from the first network-based radio station to the subscriber station, the first network-based radio station and the subscriber station communicate with one another using radio resources which are different than the radio resources allocated to the subscriber station from the first network-based radio station.

12. The method as claimed in claim 1, wherein the first network-based radio station receives the message from the subscriber station confirming receipt of the signal and sends the second network-based radio station an instruction to perform the handover.

13. The method as claimed in claim 1, wherein the second network-based radio station receives the message from the subscriber station confirming receipt of the signal and sends the first network-based radio station an instruction to perform the handover.

14. The method as claimed in claim 1, wherein the communication of the subscriber station is communication in a downlink.

15. A method of communication by radio, comprising:
receiving, at a subscriber station, information concerning an allocation of radio resources to the subscriber station from a first network-based radio station and communicating with the first network-based radio station using a portion of the radio resources;
receiving, at the subscriber station, a signalling signal intended exclusively for the subscriber station from a second network-based radio station using another portion of the allocated radio resources, the another portion of the allocated radio resources being allocated by the first network-based radio station; and
sending a message confirming receipt of the signalling signal to the first network-based radio station and/or the second network-based radio station from the subscriber station,
wherein a communication of the subscriber station is handed over from the first network-based radio station to the second network-based radio station when the signalling signal is confirmed to have been received, wherein the second network-based radio station stops sending the signalling signal after the subscriber station has been handed over from the first network-based radio station to the second network-based radio station.

16. The method as claimed in claim 15, wherein the communication between the subscriber station and the first network-based radio station takes place at a same time as when the signalling signal is sent by the second network-based radio station.

17. The method as claimed in claim 15, wherein the radio resources are a plurality of sub-bands of a frequency band.

18. The method as claimed in claim 15, wherein the signalling signal from the second network-based radio station is a synchronization signal.

19. The method as claimed in claim 18, wherein the subscriber station uses the synchronization signal to perform synchronization, thereby allowing communication between the subscriber station and the second network-based radio station.

20. The method as claimed in claim 15, wherein the handover of the subscriber station from the first network-based radio station to the second network-based radio station is immediately followed by the communication between the subscriber station and the second network-based radio station using the other portion of the radio resources.

21. The method as claimed in claim 15, wherein prior to the sending of the signalling signal, the first network-based radio station sends the second network-based radio station information concerning the other portion of the radio resources.

22. The method as claimed in claim 21, wherein the second network-based radio station starts to send the signalling signal after the second network-based radio station has received the information concerning the other portion of the radio resources.

23. The method as claimed in claim 15, wherein after the handover of the subscriber station from the first network-based radio station to the second network-based radio station, the second network-based radio station allocates to the subscriber station radio resources different than the radio resources allocated to the subscriber station from the first network-based radio station.

24. The method as claimed in claim 15, wherein prior to the allocation of the radio resources from the first network-based radio station to the subscriber station, the first network-based radio station receives a message from the subscriber station concerning the handover of the communication of the subscriber station from the first network-based radio station to the second network-based radio station.

25. The method as claimed in claim 15, wherein prior to the allocation of the radio resources from the first network-based radio station to the subscriber station, the first network-based radio station and the subscriber station communicate with one another using radio resources which are different than the radio resources allocated to the subscriber station from the first network-based radio station.

26. The method as claimed in claim 15, wherein the first network-based radio station receives the message from the subscriber station confirming receipt of the signal and sends the second network-based radio station an instruction to perform the handover.

27. The method as claimed in claim 15, wherein the second network-based radio station receives the message from the subscriber station confirming receipt of the signal and sends the first network-based radio station an instruction to perform the handover.

28. The method as claimed in claim 15, wherein the communication of the subscriber station is communication in a downlink.

29. A radio communication system having a subscriber station, comprising:
a first network-based radio station allocating radio resources to the subscriber station and communicating with the subscriber station using a portion of the radio resources;
a second network-based radio station sending a signalling signal intended exclusively for the subscriber station using another portion of the allocated radio resources, the another portion of the allocated radio resources being allocated by the first network-based radio station;
wherein the first network-based radio station and/or the second network-based radio station receive a message from the subscriber station confirming receipt of the signalling signal, the first network-based radio station and the second network-based radio station handing over a communication of the subscriber station from the first network-based radio station to the second network-based radio station upon receipt of the message from the subscriber station, wherein the second network-based radio station stops sending the signalling signal after the subscriber station has been handed over from the first network-based radio station to the second network-based radio station.

* * * * *